US011920399B2

(12) United States Patent
Sellinger et al.

(10) Patent No.: US 11,920,399 B2
(45) **Date of Patent: *Mar. 5, 2024**

(54) COMPACT DOOR CLOSER

(71) Applicant: Masonite Corporation, Tampa, FL (US)

(72) Inventors: Joel Sellinger, Blaine, WA (US); Benjamin Wesley Docksteader, Custer, WA (US)

(73) Assignee: MASONITE CORPORATION, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,265

(22) Filed: Sep. 6, 2022

(65) Prior Publication Data

US 2022/0412145 A1 Dec. 29, 2022

Related U.S. Application Data

(63) Continuation of application No. 17/042,366, filed as application No. PCT/US2019/024871 on Mar. 29, 2019, now Pat. No. 11,434,682.

(Continued)

(51) Int. Cl.
*E05F 15/00* (2015.01)
*E05F 15/63* (2015.01)

(52) U.S. Cl.
CPC ......... *E05F 15/63* (2015.01); *E05Y 2201/216* (2013.01); *E05Y 2201/41* (2013.01);

(Continued)

(58) Field of Classification Search
CPC ........... E05F 15/63; E05F 15/77; E05F 15/72; E05Y 2201/688; E05Y 2400/612; E05Y 2201/474; E05Y 2800/232; E05Y 2800/404; E05Y 2201/624; E05Y 2201/266; E05Y 2800/238; E05Y 2900/132; E05Y 2600/46; E05Y 2800/746;

(Continued)

(56) References Cited

U.S. PATENT DOCUMENTS

| | | | | |
|---|---|---|---|---|
| 5,878,530 | A | 3/1999 | Eccleston et al. | |
| 5,930,954 | A | 8/1999 | Hebda | |
| 6,061,964 | A | 5/2000 | Arnell et al. | |
| 6,588,153 | B1 * | 7/2003 | Kowalczyk ............. | E05F 15/63 49/340 |
| 8,390,219 | B2 * | 3/2013 | Houser ................... | E05F 15/40 318/400.38 |
| 8,407,937 | B2 * | 4/2013 | Houser ................... | E05F 15/63 49/346 |

(Continued)

FOREIGN PATENT DOCUMENTS

GB 2286012 A 8/1995

OTHER PUBLICATIONS

International Search Report—PCT/US19/24871—dated Jun. 10, 2019.
Extended EP Search Report—Related EP Application No. 19778106.5—dated Nov. 22, 2021.

*Primary Examiner* — Chi Q Nguyen
(74) *Attorney, Agent, or Firm* — CANTOR COLBURN LLP

(57) ABSTRACT

An apparatus comprising a baseplate configured to be coupled to an interior side of an inswing door adjacent a pivot edge of the door; a rotatable closing arm with a first end and a second end, the second end coupled to a motor, the motor configured to be engaged in response to receipt of a signal from a remote electronic device; and circuitry electrically coupled between a power supply and the motor, the circuitry configured to wirelessly send and receive information to and from the remote electronic device.

20 Claims, 13 Drawing Sheets

Related U.S. Application Data

(60) Provisional application No. 62/650,694, filed on Mar. 30, 2018.

(52) U.S. Cl.
CPC ... *E05Y 2201/624* (2013.01); *E05Y 2201/688* (2013.01); *E05Y 2400/612* (2013.01); *E05Y 2400/66* (2013.01); *E05Y 2900/132* (2013.01)

(58) Field of Classification Search
CPC ........... E05Y 2800/74; E05Y 2800/692; E05Y 2201/41; E05Y 2400/66; E05Y 2900/134; E05Y 2800/252; E05Y 2400/32; E05Y 2201/216
USPC .................. 49/340, 358, 324, 334, 348, 349
See application file for complete search history.

(56) References Cited

U.S. PATENT DOCUMENTS

| | | | | |
|---|---|---|---|---|
| 9,574,389 | B2 * | 2/2017 | Menze | E05B 1/0053 |
| 11,434,682 | B2 * | 9/2022 | Sellinger | E05F 15/63 |
| 11,661,786 | B2 * | 5/2023 | Langenberg | E05F 15/73 49/31 |
| 2005/0091928 | A1 | 5/2005 | Okulov et al. | |
| 2010/0065705 | A1 | 3/2010 | Brown et al. | |
| 2010/0115853 | A1 | 5/2010 | Gebhart et al. | |
| 2010/0242368 | A1 | 9/2010 | Yulkowski | |
| 2011/0252597 | A1 | 10/2011 | Burris et al. | |
| 2016/0348415 | A1 | 12/2016 | Baumgarte | |
| 2018/0305969 | A1 * | 10/2018 | Docksteader | E05F 15/72 |
| 2019/0376332 | A1 * | 12/2019 | Chi-Hsueh | E05F 15/73 |
| 2019/0390503 | A1 * | 12/2019 | Teta | E05F 1/1207 |
| 2020/0165857 | A1 * | 5/2020 | Yulkowski | E05F 15/70 |

* cited by examiner

COMPACT DOOR CLOSER

CROSS-REFERENCE TO RELATED APPLICATIONS

This application is a continuation of U.S. patent application Ser. No. 17/042,366 filed Sep. 28, 2020, now U.S. Pat. No. 11,434,682, which is a National Phase of International Application No. PCT/US2019/024871 filed Mar. 29, 2019, which claims priority to U.S. Patent Application No. 62/650,694, filed on Mar. 30, 2018, which is incorporated herein by reference, in its entirety, for any purpose.

FIELD

The disclosure relates generally to door closing devices. Examples are described of devices that may facilitate closure of a door responsive to a signal, such as a signal sent from a remote device including a smoke or fire alarm or home protection system.

BACKGROUND

For some people, physically closing interior doors in the home all the time or even every night may not be appealing or may be burdensome. In regards to fire safety, a closed door may greatly reduce the spread of fire and smoke. This can save lives, limit damage, and in some cases even help suppress the fire. In other situations, such as a non-emergency event, it may be desirable for a door closing device to be remotely operated to close a door in response to a signal. There exists a need for an apparatus, system, and methods that close a door when triggered by an input, for example, a built in smoke detector, an audio trigger from a smoke detector, a wireless signal from a home protection system, or a manual button by a user.

BRIEF SUMMARY

The disclosure relates generally to door closing devices. Examples are described of devices that may facilitate closure of a door responsive to a signal from a remote electronic device, including alarms or monitors found throughout a residence.

In some examples, an apparatus includes a baseplate configured to be coupled to an interior side of an inswing door adjacent a pivot edge of the door; a rotatable closing arm with a first end and a second end, the second end coupled to a motor, the motor configured to be engaged in response to receipt of a signal from a remote electronic device; and circuitry electrically coupled between a power supply and the motor, the circuitry configured to wirelessly send and receive information to and from the remote electronic device.

In some examples, in response to receipt of the signal from the remote electronic device, the motor is configured to rotate the closing arm to contact an adjacent surface separate from the door.

In some examples, the closing arm is configured to exert a closing force on the adjacent surface that repositions the door.

In some examples, the motor is configured to transmit a rotational force through the closing arm to exert the closing force on the adjacent surface, and the closing force repositions the door to a closed position.

In some examples, the adjacent surface is generally parallel to a plane extending through a door frame the door is coupled to.

In some examples, the adjacent surface is generally normal to a plane extending through a door frame the door is coupled to.

In some examples, the adjacent surface is a door trim surrounding a portion of the door.

In some examples, the apparatus includes a proximity sensor configured to determine a position of the closing arm.

In some examples, the apparatus includes a proximity sensor configured to determine a position of the door.

In some examples, in response to receipt of a signal from the proximity sensor indicating the door is in a closed position, the motor is disengaged.

In some examples, the first end of the closing arm is coupled to a roller.

In some examples, the closing arm has a maximum travel distance from a home position, and the maximum travel distance is used to determine when the door is in a closed position.

In some examples, the apparatus includes a clutch coupling the motor to the closing arm.

In some examples, the apparatus includes a baseplate configured to be coupled to an interior side of an inswing door, the door configured to be positioned in an open position, a closed position, and a plurality of positions in between the open position and the closed position; a closing arm with a first end biasedly coupled to a second end, the second end coupled to a motor, the closing arm configured to be positioned in a home position and an engaged position; the motor coupled to the baseplate and configured to be activated in response of a signal from a remote electronic device; a first proximity sensor configured to determine a position of the closing arm; a second proximity sensor configured to determine a position of the door; and circuitry electrically coupled to a power supply, the motor, the first proximity sensor and the second proximity sensor, the circuitry configured to wirelessly send and receive information to and from the remote electronic device.

In some examples, in the home position, the first end of the closing arm is adjacent the baseplate and the door may be positioned in the open position, the closed position, or a plurality of positions in between the open position and the closed position.

In some examples, in response to receipt of the signal from the remote electronic device, the motor is configured to reposition the closing arm from the home position to the engaged position, wherein in the engaged position the closing arm contacts an adjacent surface and exerts a closing force on the adjacent surface that is translated through the closing arm to the door.

In some examples, in response to a signal from the second proximity sensor indicating the door is in the closed position, the motor is deactivated.

In some examples, a method includes receiving a signal from a remote electronic device at an apparatus, the apparatus coupled to an inswing residential door; rotating a closing arm of the apparatus from a home position to an engaged position; contacting the closing arm with an adjacent surface; exerting a closing force on the adjacent surface with the closing arm; rotating the door from an open position to a closed position; and rotating the closing arm from the engaged position to the home position.

In some examples, the method includes sending and receiving a signal from a first proximity sensor and determining a position of the closing arm.

In some examples, the method includes sending and receiving a signal from a second proximity sensor and determining a position of the door.

This Summary is provided to introduce a selection of concepts in a simplified form that are further described below in the Detailed Description. This Summary is not intended to identify key features or essential features of the claimed subject matter, nor is it to be used to limit the scope of the claimed subject matter. A more extensive presentation of features, details, utilities, and advantages of the present disclosure as defined in the claims is provided in the following written description of various embodiments of the disclosure and illustrated in the accompanying drawings.

BRIEF DESCRIPTION OF THE DRAWINGS

The images which accompany the written portion of this specification illustrate examples and methods of use for the present disclosure according to the teachings of the present disclosure.

DETAILED DESCRIPTION

Various examples of a system for closing a door in response to a remote signal are disclosed herein. In accordance with examples herein, a system for closing a door in response to a receipt of a signal may include an apparatus coupled to a door, wherein the apparatus has the capability to move or alter a position of the door. A control system may be used to receive a remote signal to move or alter the position of the door and send a signal to the apparatus to move or alter the position or the door. In some examples, the apparatus and control system are electrically connected. For example, a smoke alarm may send a signal to the control system, which engages the apparatus to close the door(s) in a residence.

Remote signals and/or remote computing devices described herein generally include signals which may be generated at a location other than the door to be activated or deactivated by the signal and/or computing devices which are not mounted to or mechanically connected to the door. In some examples, the remote signals may be generated at and/or the remote computing devices may be located at a location which is in the room associated with the door, in the building associated with the door, outside the building associated with the door, and/or at a location other than the door which is in wired or wireless electronic communication with a device on the door.

Figure 1:
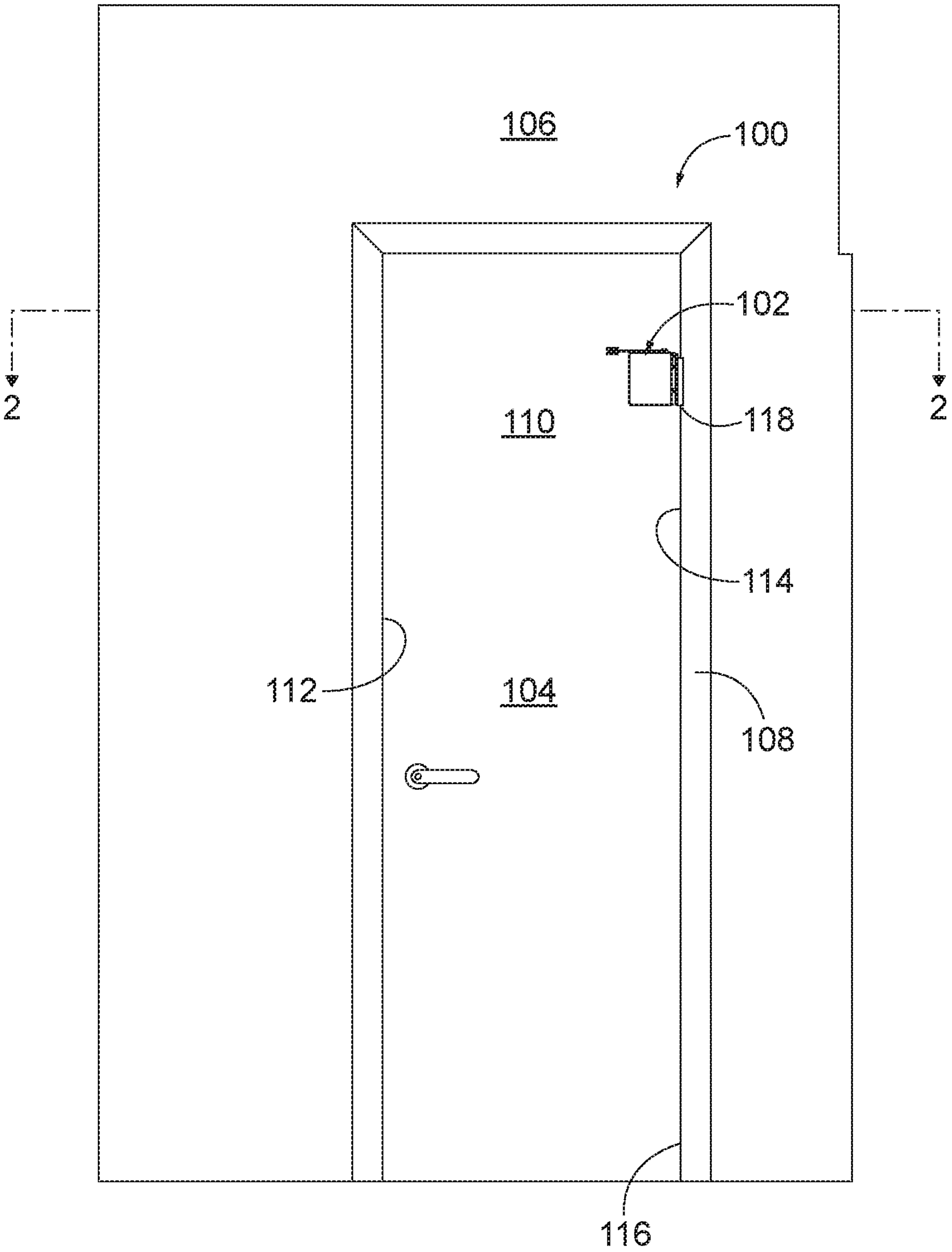
FIG. 1 illustrates a door closing system in accordance the present disclosure.

FIG. 1 illustrates a door closing system 100 in accordance with the present disclosure. In some examples, the door closing system 100 is able to determine the position of the door, such as if it is open, closed, or positioned somewhere in between. In some examples, in response to receipt of a signal from a remote electronic device, the door closing system 100 may extend a closing arm to contact at least one of an adjacent surface or structure, such as a wall, jamb, casing, frame, trim and the like. The closing arm may exert a closing force on the adjacent structure. The closing force is translated through the door closing system 100 to pivot the door and move the door into a closed position. In some examples, the receipt of the signal may include a signal sent from alarms, such as smoke, fire, carbon monoxide, gas or intruder alarms or monitoring devices. The device may use at least one proximity sensor or switch to determine the position of the closing arm. In some examples, the device may use at least one proximity sensor or switch to determine the position of the door with respect to the adjacent surface.

The door closing system 100 of FIG. 1 may include a door closing device 102; a door 104 with an interior side 110, a handle edge 112, and a pivot edge 114; a wall 106; a trim 108; a frame 116; and a hinge 118. In some examples, the door closing system 100 may include the remote electronic device. In some examples, the door closing system 100 does not include the remote electronic device. In some examples, the door closing system 100 only includes the door closing device 102.

In some examples, the door closing device 102 is coupled to the interior side 110 of the inswing door 104 adjacent the pivot edge 114 of the door. The door may be pivotally coupled to the door frame using a hinge, such as a butt hinge, a pivot hinge, an offset pivot hinge, or other suitable hinge styles.

The door 104 of FIG. 1 is shown as viewed from the interior of the room, and is in a left hand inswing style configuration. In this configuration, when viewing the door 104 from the exterior the room, the door 104 has hinges on the left and therefore its pivot edge is on the left and swings into the room. In some examples, the door closing system 100 may also be implemented on a right hand inswing configuration, where the hinges are positioned on the right edge of the door when viewing the door from the exterior, and the door swings into the room. In some examples, the door closing system 100 may also be implemented on a left hand outswing style configuration, where from the exterior of the room, the door has hinges on the left edge of the door and swings out from the room. In some examples, the door closing system 100 may also be implemented on a right hand outswing style configuration, where from the exterior of the room, the door has hinges on the right edge of the door and swings out from the room. The door closing system 100 may be implemented on double door configurations. For ease of reference, the figures depicting the various embodiments herein are described with reference to the left hand inswing configuration, but may be used with the other door configurations described or contemplated.

In use, the door closing system 100 includes a powertrain assembly that includes a motor to rotate a closing arm to contact an adjacent surface to facilitate forcing the door to close. The adjacent surface may be separate from the door. In some examples, the adjacent surface may be generally parallel to a plane extending through a door frame the door is coupled to, such as a wall surrounding the door. In some examples, the adjacent surface may be a surface that is generally normal to a plane through the door frame that the door is coupled to, for example, when the door is positioned between two walls that form a corner or that are positioned at an angle with respect to each other. In some examples, the adjacent surface is a door trim surrounding a portion of the door, regardless of the configuration of the wall or walls near the door closing system 100.

Figure 2:
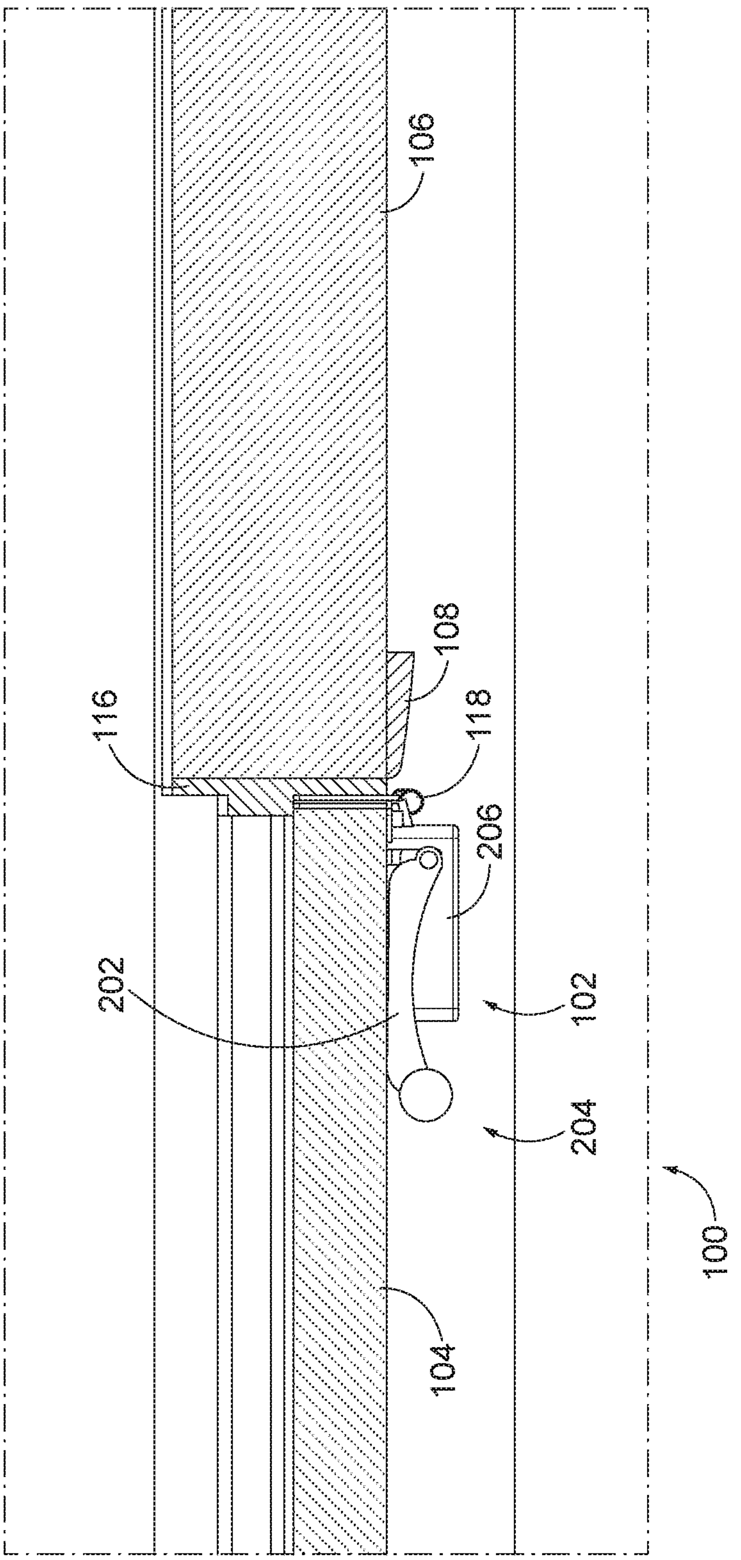
FIG. 2 shows a cross-sectional view along line 2-2 of the door closing system of FIG. 1.

FIG. 2 illustrates a cross-sectional view of the door closing system 100 of FIG. 1 along line 2-2. FIG. 2 shows the door 104, wall 106, trim 108, hinge 118, and the door closing device 102 with a closing arm 202 and a cover 206. The closing arm 202 is shown in a home position 204. In the home position 204, the closing arm 202 may be positioned adjacent a baseplate of the door closing device 102 or adjacent an inner surface of the door (see FIG. 3).

Figure 3:
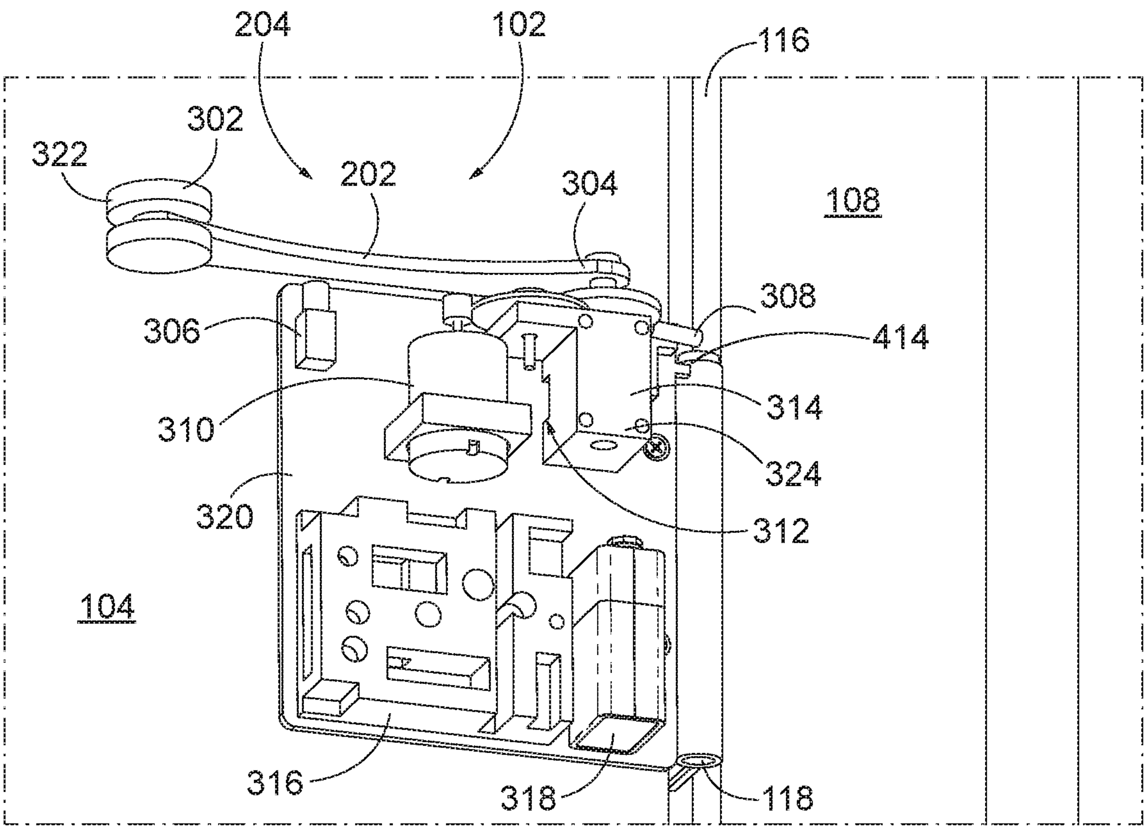
FIG. 3 illustrates a perspective view of components of a door closing system in accordance the present disclosure.
Figure 4:
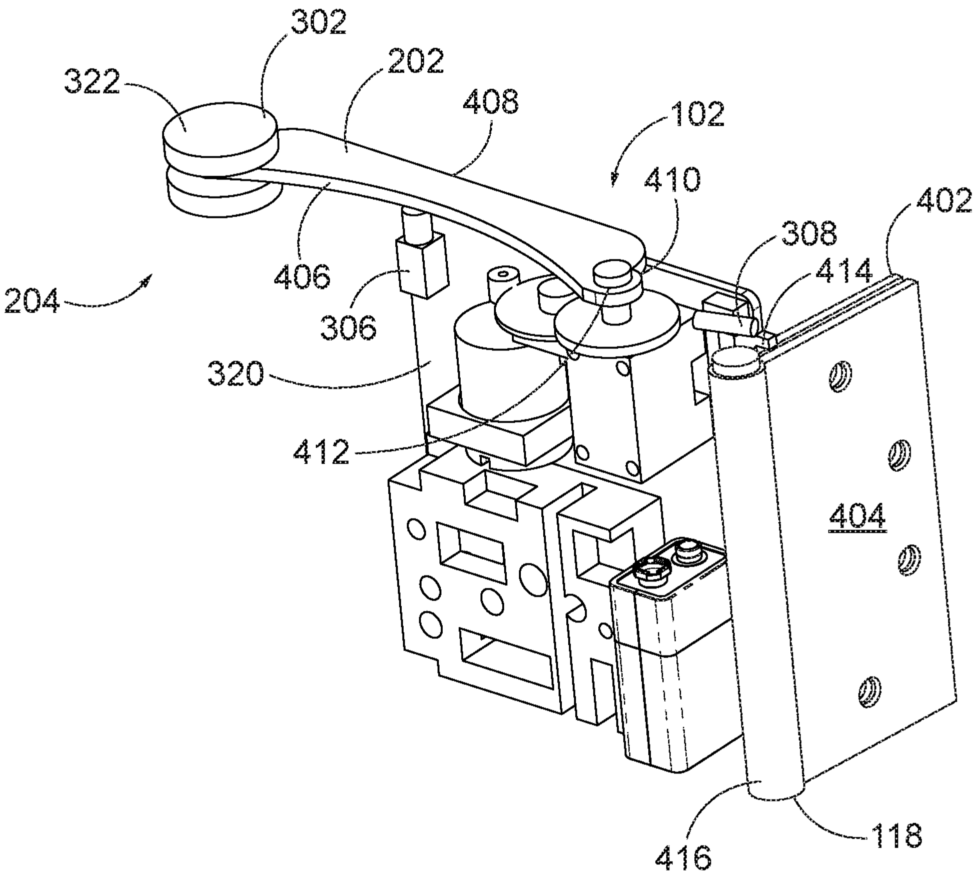
FIG. 4 illustrates an alternate perspective view of components of a door closing system in accordance with the present disclosure.

FIG. 3 illustrates a perspective view of components of a door closing system in accordance with the present disclosure and also shows the door 104, trim 108, and frame 116. The door closing device 102 may include a closing arm 202 with a first end 302 and a second end 304, an arm home proximity sensor 306, a door closed proximity sensor 308, a motor 310, a gearbox assembly 312, a pivot base 314, a clutch 324, a PCBA 316, a battery 318, and a baseplate 320. FIG. 4 illustrates an alternate perspective view of FIG. 3, and also shows a hinge 118 with hinge housing 416, door plate 402, and a frame plate 404. The cover 206 is hidden in FIGS. 3 and 4.

As shown in FIGS. 3 and 4, the rotatable closing arm 202 includes the first end 302 and the second end 304. In some examples, the closing arm 202 may be positioned at or near the top of the door closing device 102, such that when the cover 206 is in place, the closing arm is positioned above or external to the cover.

The first end 302 of the closing arm 202 is a free end, i.e., not fastened or permanently attached to any surface of the door 104. In some examples, the free first end 302 of the closing arm 202 is provided with a roller 322 rotatably mounted to the free first end 302 of the closing arm 202. In some examples, the second end 304 is drivingly coupled to the motor 310. A first edge 406 (see FIG. 4) of the closing arm 202 may be concave shaped. The curved shaped of the first edge 406 may allow it to avoid potentially undesirable contact with the decorative trim 108 or hinge 118 of the door assembly (see FIG. 9). In some examples, if the first edge 406 contacts the trim 108 or hinge 118, the closing arm 202 could damage the trim 108 or hinge 118, or the closing arm may be damaged. In some examples, the curved shaped of the first edge 406 helps to ensure that the roller 322 positioned on the free first end 302 properly contacts an adjacent surface and that the closing force is only transmitted through the free first end 302 to the adjacent surface. A second edge 408 of the closing arm 202 may be curved or flat, so that it may be compactly positioned adjacent the baseplate 320 or interior side of the door. In some examples, the second end 304 includes a cutout 410 so that the closing arm 202 does not interfere with other components during operation. In some examples, the second end 304 of closing arm 202 is coupled to the gearbox assembly 312 at the pivot connection 412 (see FIG. 4).

In some examples, the roller 322 is positioned on the first end 302. The roller may include a solid core center with a soft exterior coating. In some examples, the exterior coating may be formed of silicone, rubber, polyurethane, or similar material(s).

In some examples, the motor 310 and gearbox assembly 312 may be used to convert the rotation of an output shaft of the motor and transmit the power to the closing arm 202 to rotate the second end 304 of the closing arm 202. In some examples, the door closing device 102 includes a combined motor and gearbox assembly.

The door closing device 102 includes circuitry, such as a PCBA 316, electrically coupling the power supply, for example the battery 318, the motor, and proximity sensors. The circuitry may wirelessly send and receive information between the door closing device 102 and the remote electronic device, and within the door closing system 100. Circuitry described herein may generally include any of a variety of electronics, including printed circuit board assemblies (PCBAs), processor(s), controller(s), microcontroller (s), firmware, application specific integrated circuits (ASICs), transmitters, receivers, and/or other electrical components. In some examples, software (e.g., executable instructions encoded in a computer readable medium) may be used in conjunction with the circuitry.

In some examples, the door closing system 100 includes a proximity sensor, such as the arm home proximity sensor 306 that may be used to determine a position of the first end 302 of the closing arm 202, such as when the closing arm 202 is in the home position. In some examples, the door closing system 100 includes a proximity sensor, such as the door closed proximity sensor 308, that may be used to determine a position of the door, for example if the door is positioned in a closed position. The door closed proximity sensor 308 may be used to determine or sense the proximity of the adjacent door sill or frame and communicate the information throughout the system 100. In some examples, the door closed proximity sensor 308 may be positioned within the door and adjacent an open channel to provide a line of sight to the door jamb to determine when the door is in the closed position.

In some examples, the door closing system 100 may include a clutch 324 coupling the motor to the closing arm. The clutch may be coupled or positioned within the gearbox assembly 312, for example within the pivot base 314. The clutch may be desirable so that even when the closing arm 202 is positioned in an engaged position, such as in engaged position 602 of FIG. 6, and contacting an adjacent surface, a user may physically move the door into an open position, such as open position 502 of FIG. 5, without damaging the door closing device 102.

In some examples, the baseplate 320 include mounting holes so that fasteners may be used to couple the baseplate 320 to the door. In some examples, a pressure sensitive adhesive tape, such as a double-sided tape, may be used to secure the baseplate to the door, which may simplify the installation of the system. In some examples, the baseplate 320 includes a tab 414 positioned on an edge that will be adjacent the pivot edge of the door. The tab 414 may be used to align the baseplate 320, and therefore the door closing device 102, with an existing hinge 118 or hinge assembly formed of the hinge 118, frame plate 404, and door plate 402. When assembled, the door plate 402 may be coupled to the pivot edge of the door, and the frame plate 404 may be coupled to the door frame. In some examples, the baseplate 320 is separate from the hinge housing 416 or hinge 118, door plate 402 and frame plate 404. In some examples, the hinge housing 416 is detachably coupled with the baseplate 320. In some examples, the baseplate 320 and hinge frame 116 or hinge 118 are formed as an integrated assembly. In some examples, the baseplate 320 is detachably coupled to the door plate 402. In some examples, the baseplate 320 is integrated with the door plate 402.

Generally, in use, responsive to a remote signal, the closing arm 202 may be rotated from its home position to contact an adjacent surface, and then continue to rotate to a maximum travel position at the engaged position, whereby the door is pivoted closed. Once the maximum travel is reached, the closing arm 202 may be return to the home position. In some examples, prior to the closing arm 202 moving, the door closing system 100 may determine if the door 104 is in the open position or closed position. If the door is already closed, the system may identify the closed position status and not engage the closing arm 202.

For example, the baseplate 320 of the door closing device 102 may be coupled to the interior side 110 of the inswing door 104 adjacent the pivot edge 114 of the door (see FIG. 1). The door closing system 100 may receive a signal to close the door from a remote electronic device, such as an alarm connected to a detector such as a smoke, fire, gas, home monitoring or invasion, a computer, an application on a phone or tablet, or a monitoring system. In some examples, a programmed setting within the door closing system 100 and/or door closing device 102 may communicate a signal within the door closing system 100 to cause or cease operation.

In response to receipt of the signal, the motor 310 may be activated and begin to rotate. The rotation is transmitted through the gearbox assembly 312, and to the second end 304 of the closing arm. The rotation of the second end 304 may cause the free first end 302 of closing arm 202 to pivot about the second end 304. The motor generates a closing force when rotating the closing arm from the home position 204 to the engaged position, thereby increasing an angle between the free first end 302 of the closing arm and the baseplate 320 or the interior surface of the door. The closing force is generated from the power supply, motor and gearbox assembly within the door closing system 100. The free first end 302 of closing arm 202 moves freely until it contacts an adjacent surface separate from the door 104. Thus, in the home position 204, the free first end 302 of the closing arm 202 is spaced from a surface separate from and adjacent the door 104.

As the first end 302 of the closing arm contacts the adjacent surface in the engaged position, the motor continues to rotate and transmit power through the closing arm, increasing the angle between the baseplate 320 and first end 302 and exerting a closing force on the adjacent surface. The adjacent surface is generally fixed. As the first end 302 continues to contact the adjacent surface, the door is pivoted at the hinge and away from the adjacent surface. The motor continues to rotate until the door is pushed closed. In some examples, a maximum travel distance between the first end 302 of the closing arm 202 and the baseplate 320 is known, and when the distance is reached, the system recognized that the door is positioned in a closed position. In some examples, the maximum travel distance may be a radial distance or rotation in degrees.

In some examples, in response to receipt of a signal from the proximity sensor indicating the door is in a closed position, the motor may be disengaged.

In some examples, instead of a door closed proximity sensor 308, the closing arm's maximum travel distance or rotation from the home position is used to determine when the door is in a closed position. In some examples, the door closing system 100 includes a hinge assembly with variable resistor sensor that conveys the door's position.

As shown in FIGS. 3 and 4, when the closing arm 202 is positioned in the home position 204, the first end 302 is positioned adjacent the arm home proximity sensor 306. In use, the arm home proximity sensor 306 may sense or determine the proximity of the first end 302 to determine when the closing arm 202 is positioned or has returned to the home position 204.

Figure 5:
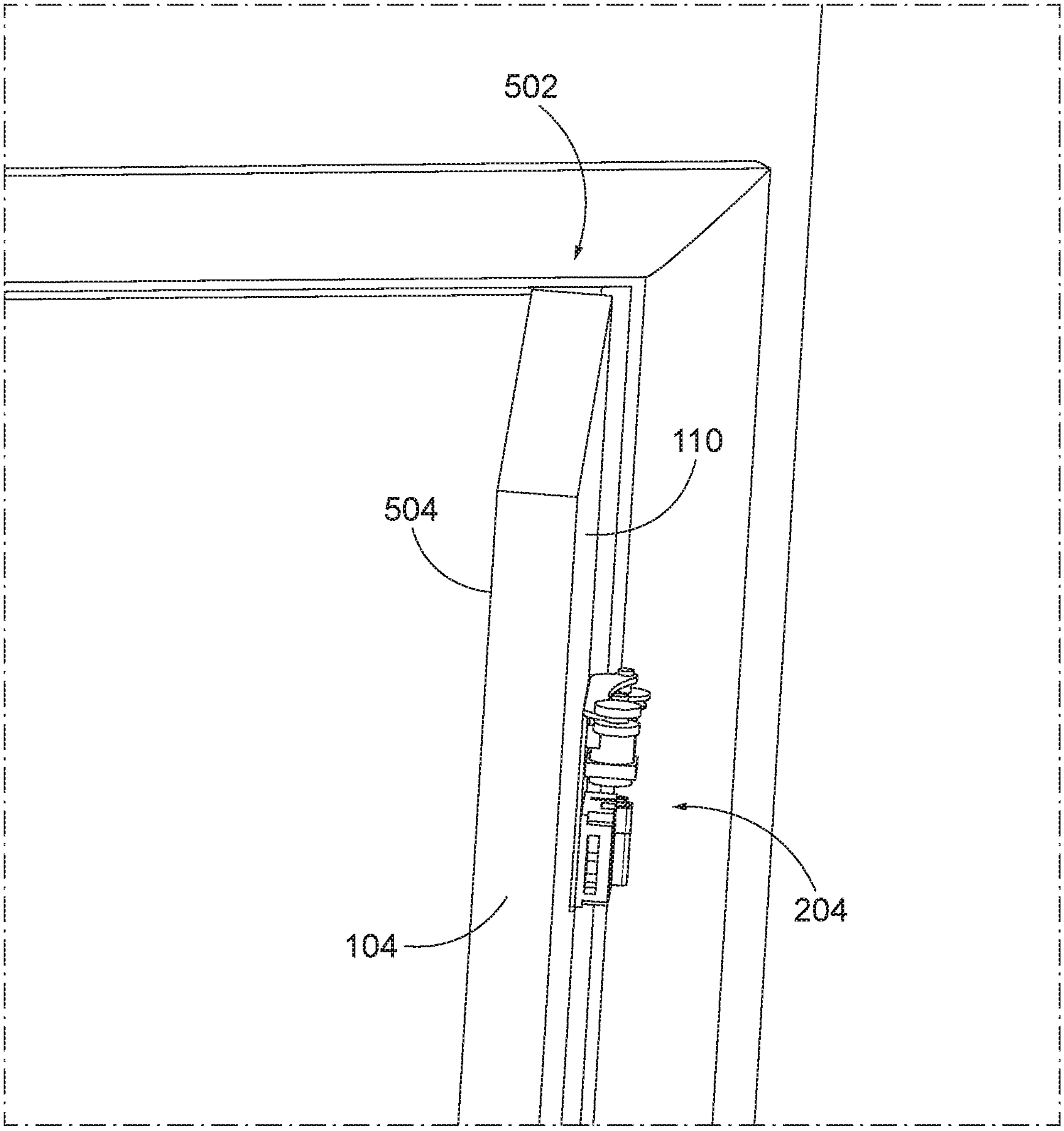
FIG. 5 illustrates a perspective view of components of a door closing system positioned in a home position and a door positioned in an open position in accordance with the present disclosure.
Figure 6:
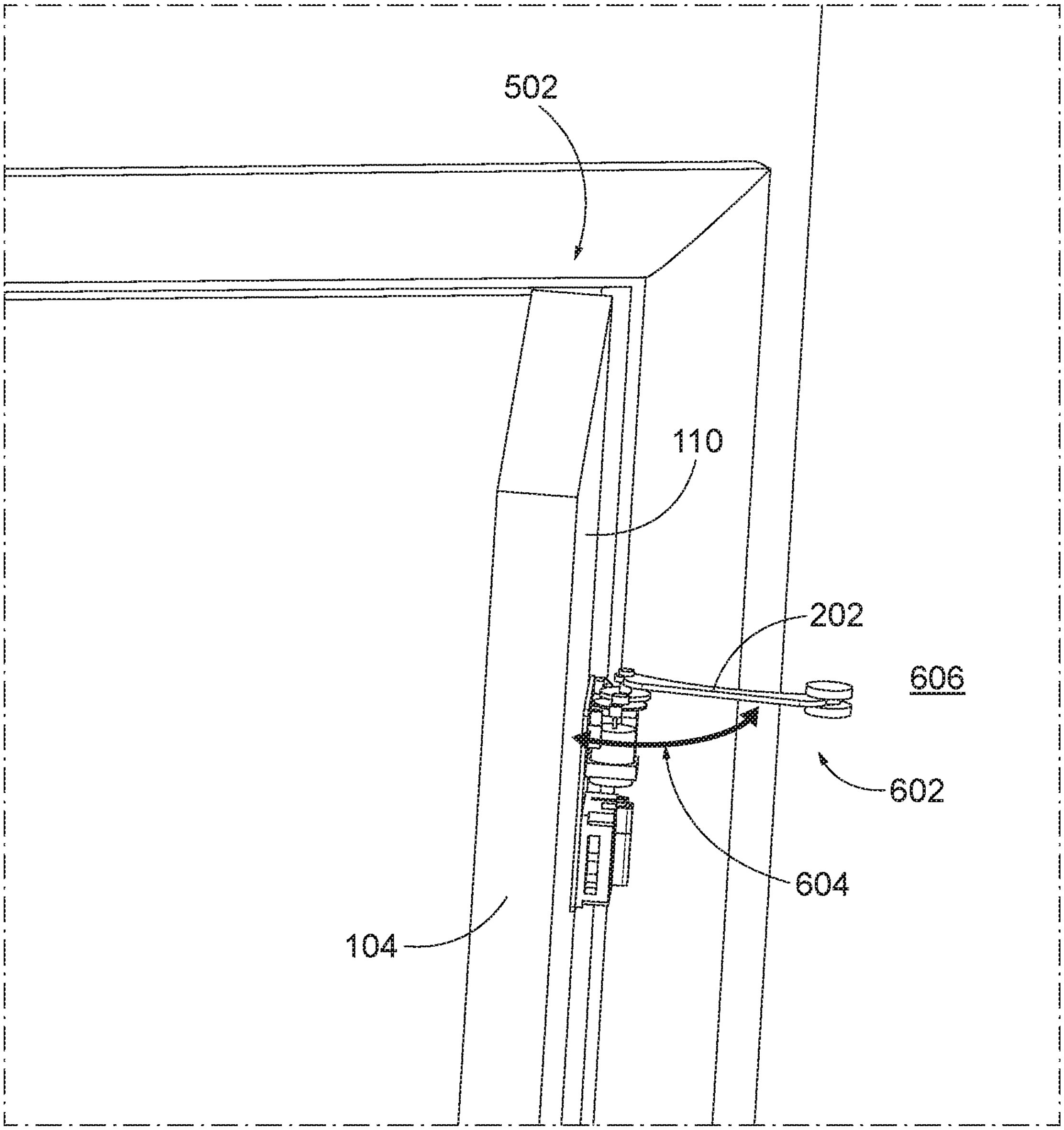
FIG. 6 illustrates a perspective view of components of a door closing system positioned in an engaged position and a door positioned in an open position in accordance with the present disclosure.
Figure 7:
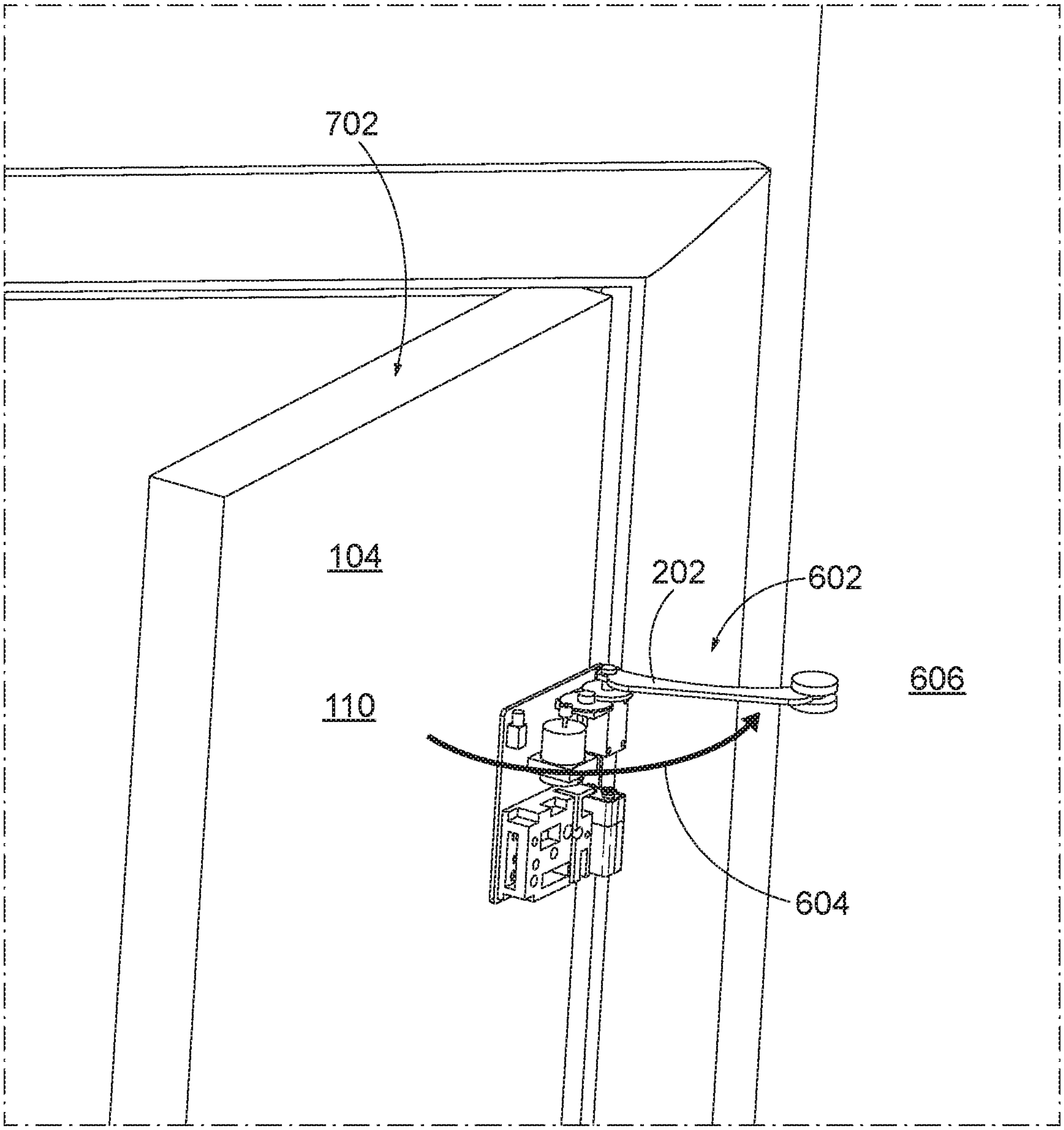
FIG. 7 illustrates a perspective view of components of a door closing system positioned in an engaged position and a door positioned in a partially open position in accordance with an embodiment.
Figure 8:
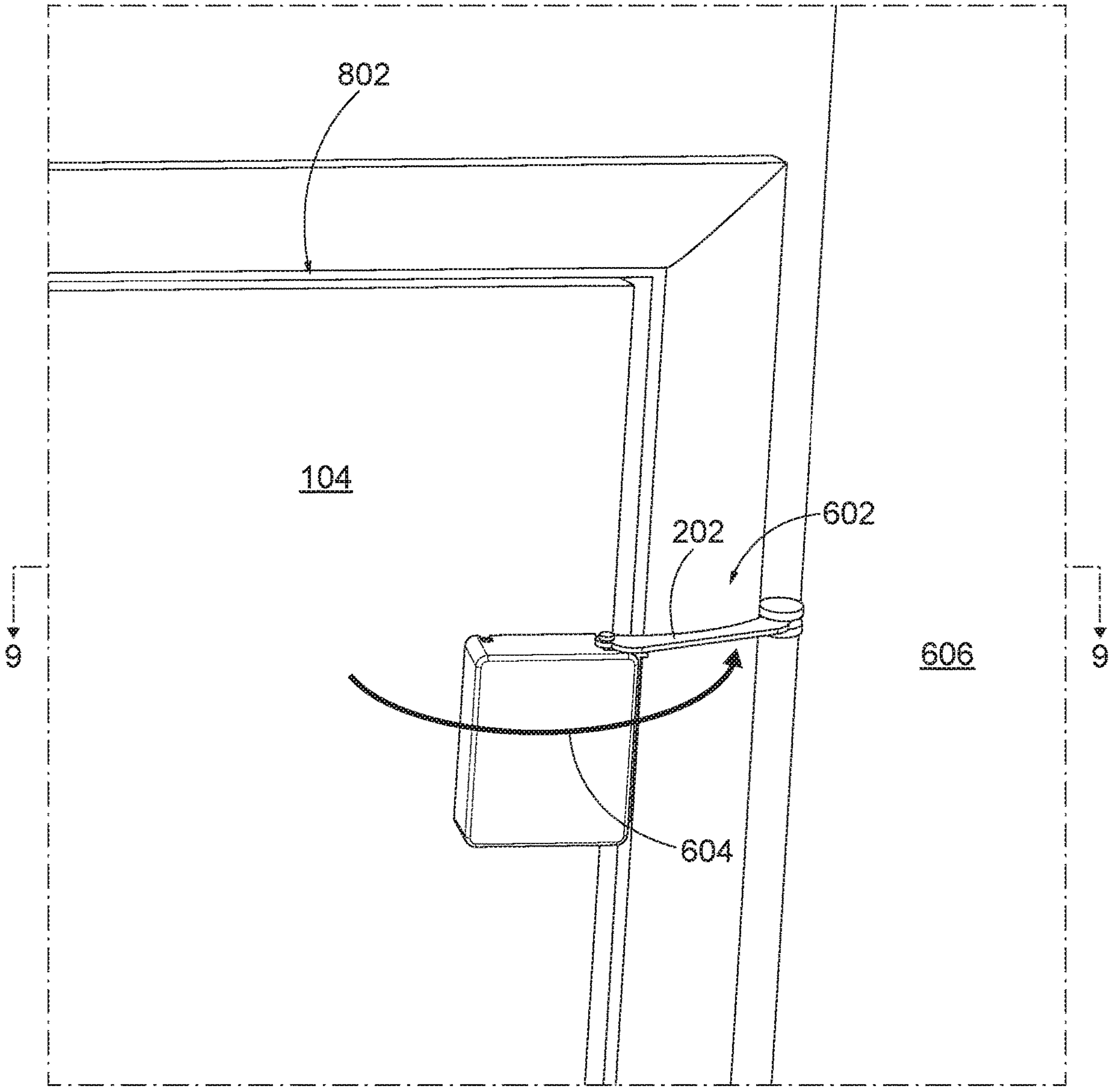
FIG. 8 illustrates a perspective view of components of a door closing system positioned in an engaged position and a door positioned in a closed position in accordance with the present disclosure.
Figure 9:
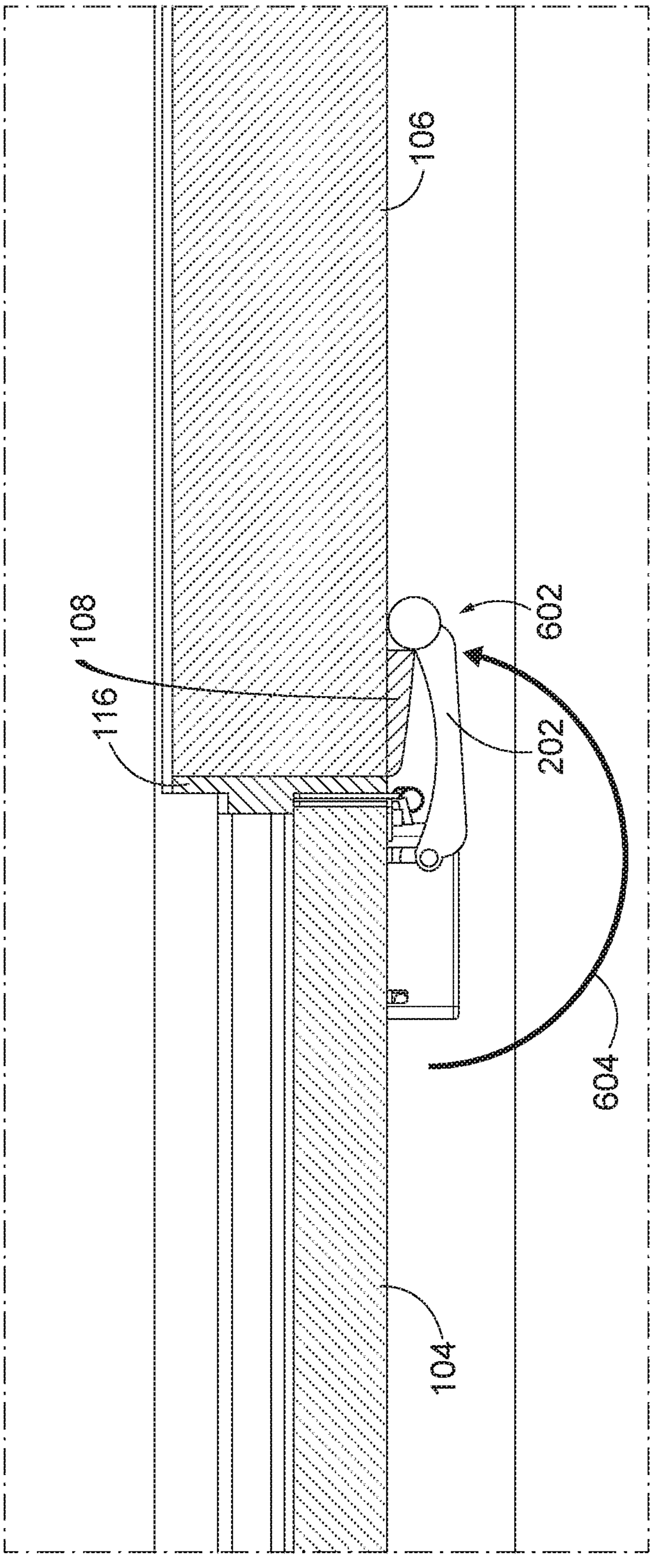
FIG. 9 shows a cross-sectional view along line 9-9 of the door closing system of FIG. 8.

FIGS. 5-9 illustrate views of the door closing system 100 in various positions. FIG. 5 illustrates the door closing device 102 positioned in the home position 204 and the door positioned in the open position 502 in accordance with the present disclosure. FIG. 6 illustrates the door closing device 102 in an engaged position 602 and the door positioned in the open position 502. In FIG. 7, the door closing device 102 is in the engaged position 602 and the door is positioned in the partial open position 702. In FIG. 8, the door closing device 102 is in the engaged position 602 and the door is in the closed position 802. FIG. 9 illustrates is cross-sectional along 9-9 of FIG. 8.

As shown in FIG. 5, in the home position 204, the closing arm 202 is positioned adjacent to the interior side 110 of the door while the door 104 is in the open position 502. FIG. 6 shows that the door closing device 102 has been activated and the closing arm 202 has been transitioned or moved into the engaged position 602, with angle 604 formed between the second edge 408 of the closing arm 202 and the interior side 110 of the door 104 or baseplate 320. In FIG. 7, the closing arm 202 is still in the engaged position 602, and the angle 604 between the closing arm 202 and the interior side 110 of the door 104 has increased such that the door is moved into the partial open position 702. In FIGS. 8 and 9, the closing arm 202 is still in the engaged position 602, with the angle 604 at or near its maximum, and the door 104 is in the closed position 802.

In use, upon receipt of the signal, such as that originally transmitted from a remote electronic device to door closing device 102, the door closing device 102 may transition from the home position 204 (FIG. 5) to the engaged position 602 (FIG. 6), where the closing arm 202 is positioned an adjacent surface 606. The door closing device 102 may then rotate or pivot the door from the open position 502 (FIG. 6), through the partial open position 702 (FIG. 7), and into the closed position 802 (FIG. 8), while the door closing device 102 remains in the engaged position 602. Upon confirmation that the door is in the closed position 802, such as through a signal transmitted from a proximity sensor or establishment that a maximum travel or angle of the closing arm 202 has been reached, the door closing device 102 may transition back to the home position 204, with the closing arm 202 retracted to be positioned adjacent the interior side 110 of the door 104 or adjacent the baseplate 320. When transitioning from the engaged position 602 to the home position 204, a proximity sensor may be used to confirm when the closing arm 202 has reached the home position 204, such that the motor is stopped or disengaged. In some examples, the measurement of the maximum travel or angle or the closing arm may also be used to identify that the closing arm 202 has reached the home position 204. Once the closing arm has been returned to the home position, the motor may be deactivated.

Figure 10:
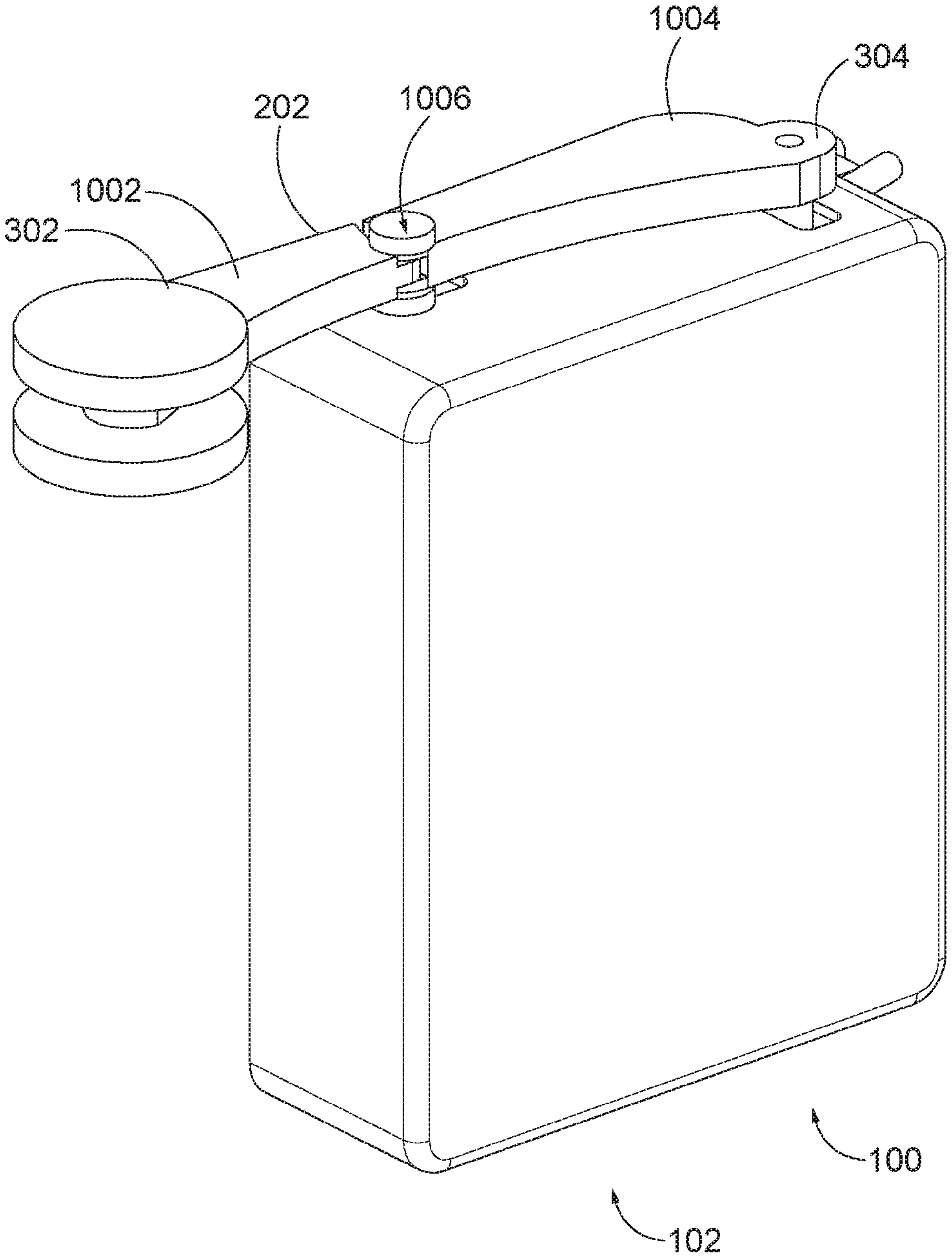
FIG. 10 illustrates a door closing system in accordance with the present disclosure.
Figure 11:
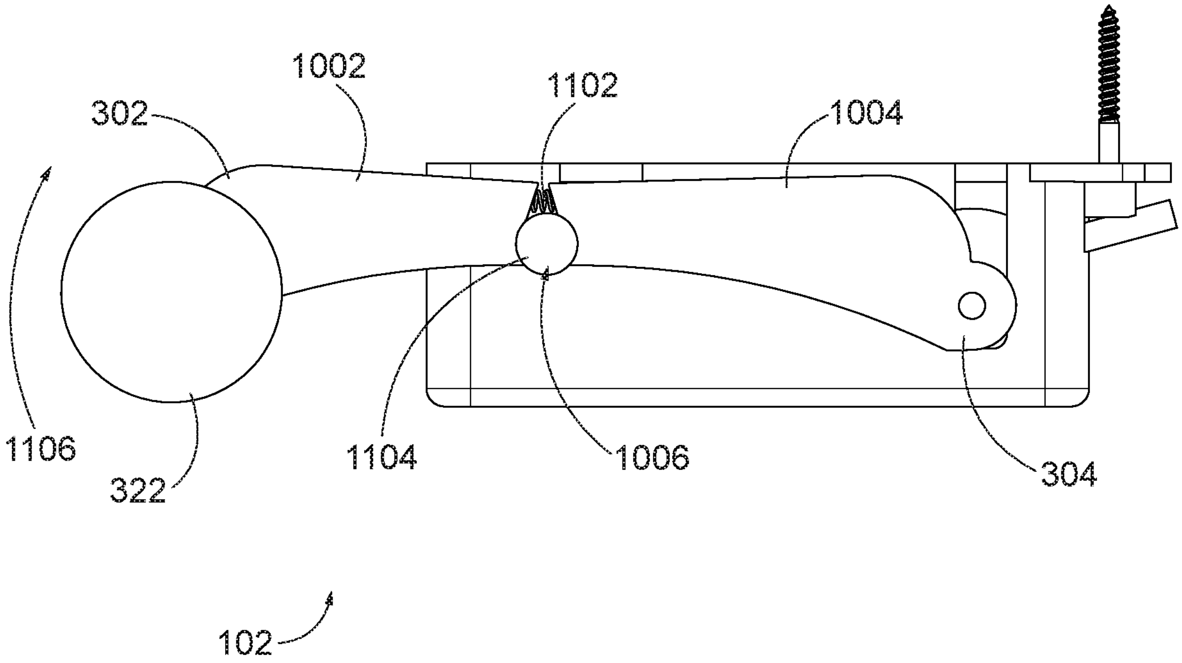
FIG. 11 illustrates a top plan view of the door closing system of the embodiment of FIG. 10.

FIGS. 10 and 11 illustrates a door closing system 100 in accordance with the present disclosure. FIG. 10 is a perspective view, and FIG. 11 is a top view of a door closing system. In some examples, the closing arm 202 may include a first portion 1002 with the first end 302, a second portion 1004 with the second end 304, and a biased coupling 1006 that biasedly couples the first portion 1002 and the second portion 1004. The biased coupling 1006 may include a hinge 1104 and a biasing element 1102 (see FIG. 11). In some examples, the biasing element 1102 is a compression spring positioned between the first portion 1002 and the second portion 1004. In some examples, the biasing element 1102 is a torsion spring, with ends positioned between the first portion 1002 and second portion 1004 and a central portion of the spring positioned generally coaxial with the hinge 1104.

In use, the biased coupling 1006 may act to smooth out the load on the motor. As the closing arm is moved into the engaged position, the roller 322 contacts the adjacent surface and starts to apply pressure to close the door. In some examples, the biased coupling 1006 may compress to help level, even out, or smooth the load on the motor. In some examples, this may help ensure that the door may be reopened even if the powertrain of the door closing device 102 stalls or otherwise fails to operate accurately.

Figure 12:
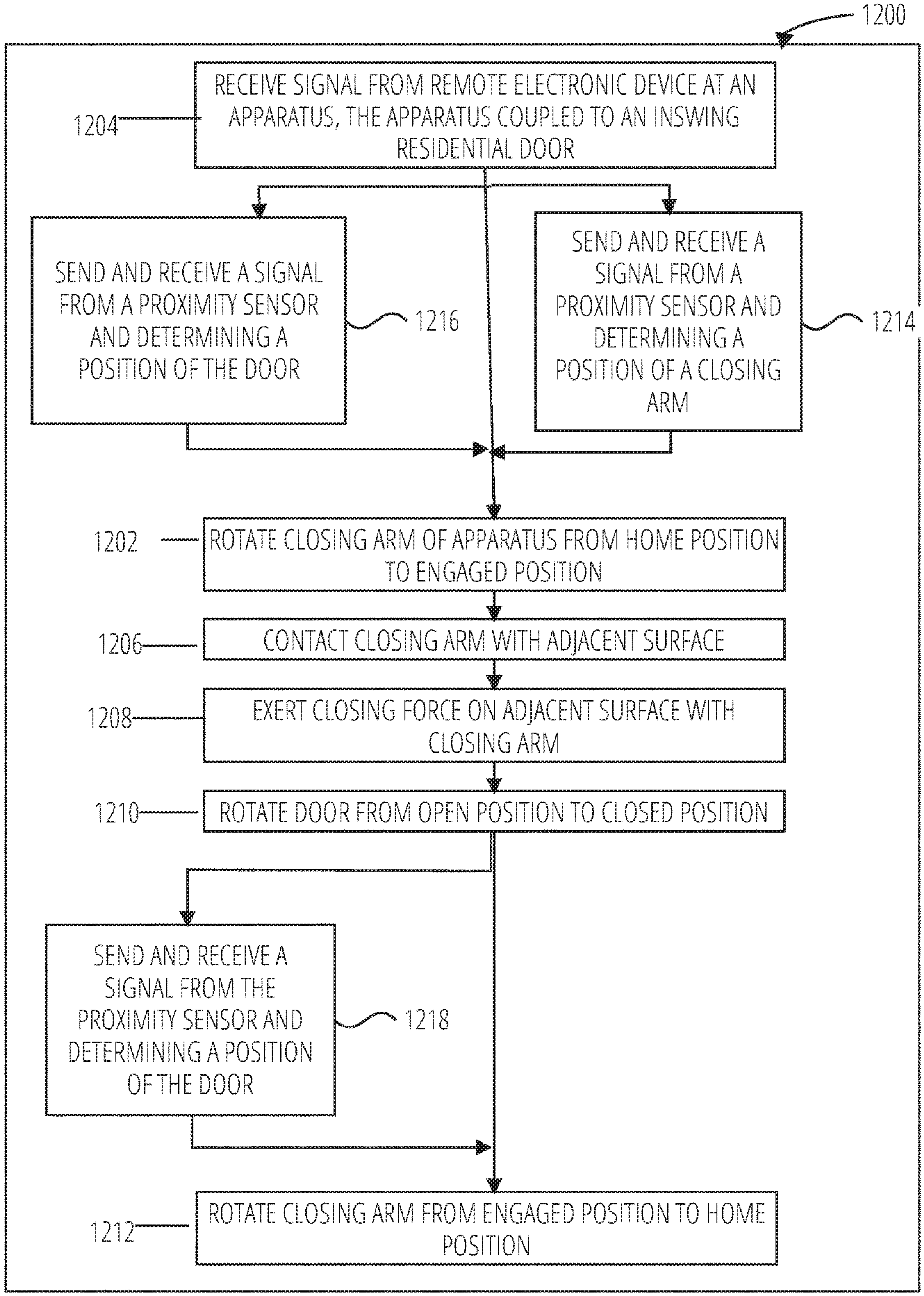
FIG. 12 illustrates a flow diagram of a method of closing a door in accordance with the present disclosure.

FIG. 12 illustrates a method of closing a door in accordance with the present disclosure. In some examples, the method 1200 includes block 1202, wherein an apparatus, such as door closing system 100, receives a signal from a remote electronic device, and the apparatus may be coupled to the inswing of a residential door. In some examples, block 1204 includes rotating a closing arm, such as closing arm 202, of the apparatus from a home position, such as home position 204, to an engaged position, such as engaged position 602. In some examples, the method 1200 may include block 1214, which includes sending and receiving a signal from a proximity sensor and determining a position of the closing arm. In some examples, the method 1200 may include block 1216, which includes sending and receiving a signal from a proximity sensor and determining a position of the door. In some examples, the method 1200 includes block 1206, which includes contacting the closing arm with an adjacent surface. The method may include block 1208, which includes exerting a closing force on the adjacent surface with the closing arm. The method may include block 1210, which includes rotating the door from an open position to a closed position. In some examples, the method 1200 may include block 1218, which includes sending and receiving a signal from a proximity sensor and determining a position of the door. In some examples, the method 1200 includes block 1212, which includes rotating the closing arm from the engaged position to the home position. In some examples, some of the blocks above are omitted or rearranged in order.

Figure 13:
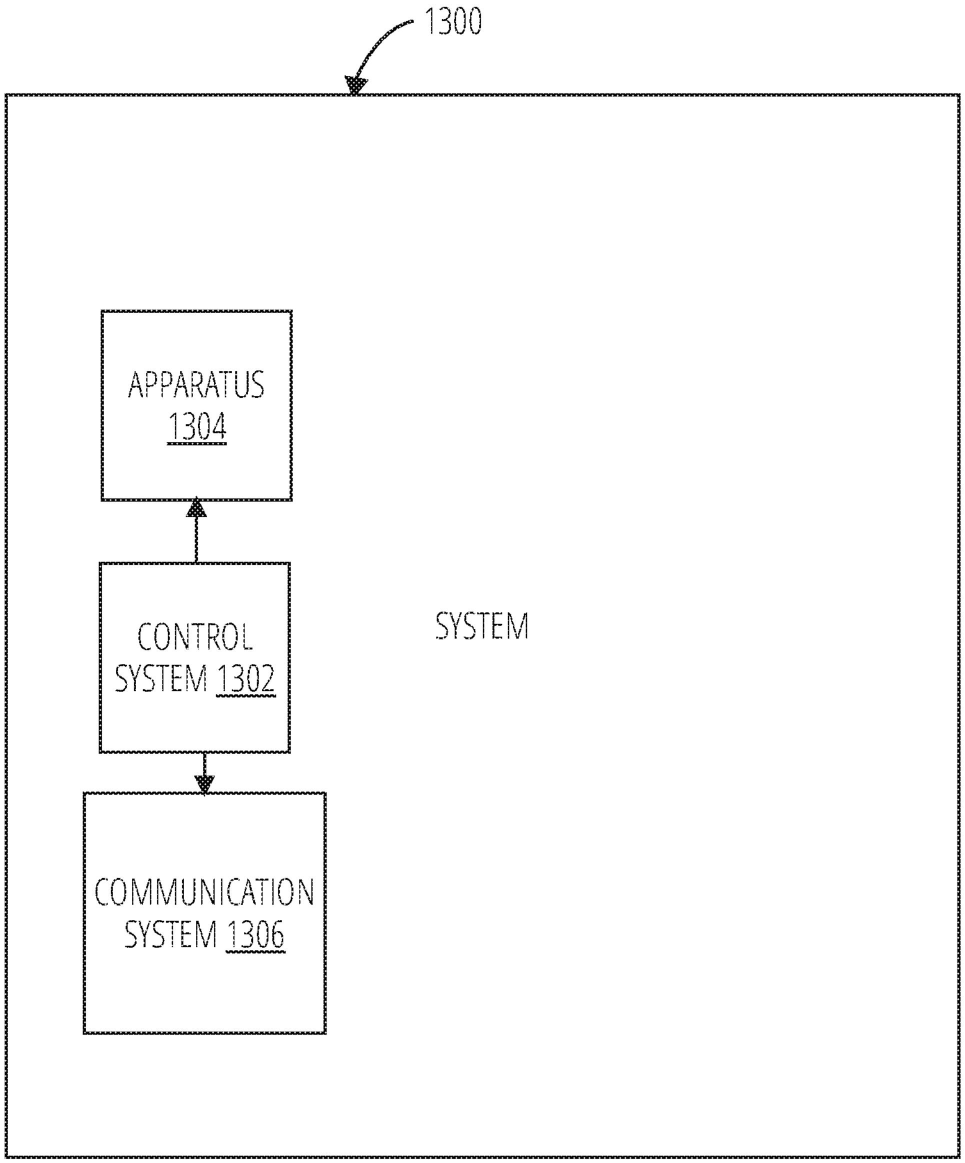
FIG. 13 is a system in accordance with the present disclosure.

FIG. 13 is a system 1300 in accordance with the present disclosure. In accordance with examples herein, the system 1300 for closing a door in response to a receipt of a signal may include an apparatus 1302 coupled to a door having the capability to move or alter a position of the door, and a control system 1304 that may be used to receive a remote signal to move or alter the position of the door and send or communicate a signal to the apparatus to move or alter the position or the door. In some examples, the apparatus 1302 and control system 1304 are electrically connected. In some examples, the control system 1304 includes a receiver to receive the remote signal and a processor to trigger a motor of a power transmission assembly of apparatus 1302 to move the door into the closed door position. The control system 1304 may be implemented, for example, using circuitry, processor(s), firmware, controller(s), and/or other electrical components. In some examples, the control system may include software (e.g., executable instructions encoded on a computer readable media) in conjunction with the control system hardware.

In some examples, the system 1300 may include a communication system 1306 that may be used to communicate various information with and about the apparatus 1302 and control system 1304. In some examples, the communication system 1306 is electrically connected to the apparatus 1302 and the control system 1304. In some examples, this communicated information may include a status of the apparatus 1302 as if the system is in a home position or an engaged position, a positional status of the door such as if the door is in an open position, a partially open or closed position, or a closed position, a status of the control system 1304, a status of the communication system 1306, the traffic between the control system 1304 and apparatus 1302, etc. The communication system 1306 may be implemented, for example, using one or more transmitters, receivers, processors, or other electrical components. In some examples, the communication system may include software (e.g., executable instructions encoded on a computer readable media) in conjunction with the communication system hardware.

In some examples, the system includes an apparatus, such as a door-mounted door position control device that controls the movement of or repositions the door by a closing arm that contacts an adjacent surface, wherein the closing arm is controlled by a motor. The device may be controlled by an application ("app"), such as a program that can run on a remote computing device, such as a computer, smartphone, tablet, or other computing device or via a dedicated remote control that, in some examples, may share similar characteristics as garage door controllers. In some examples, the device is mounted to the interior of an inswing door with apparatus mounted near the pivot edge of the door.

In some examples, location and proximity sensing may be used in the door positioning system. This function may use GPS, cellular signals, Bluetooth, NFC, Wi-Fi or similar wireless communication protocol or a combination of them. In some examples, a user may elect to automatically have doors close when they leave the immediate area of the house with their phone or tablet or remote computing device.

In some examples, the door positioning system may be used in conjunction with other smarthome devices via a smarthome hub using "if this then that" (IFTTT) controls (or other protocol controls in other examples) to provide as many different specific options as the user may wish to program. For example, door position can have benefits to home security and safety in the case of fire, earthquake or other events. Connecting the door position control device to a home automation system or IFTTT hub may help provide a variety of options including, but not limited to: closing the door when the smoke detectors are activated to slow fire growth, closing doors to hinder access into the home in the event of suspicious activity captured by a home security system, or closing doors to better enable movement by a person with a disability. In some examples, the ability to control the position of doors can provide other benefits related to energy consumptions and savings—for example ensuring exterior doors are closed when air conditioning systems are engaged.

The apparatuses and systems described herein may be combined in various forms and manners to use the apparatus that may close a door in response to receiving a signal.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present devices, systems, and structures described herein, and do not create limitations, particularly as to the position, orientation, or use of the disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions; order and relative sizes reflected in the drawings attached hereto may vary.

The above specification, examples and data provide a complete description of the structure and use of exemplary embodiments as defined in the claims. Although various embodiments of the claimed disclosure have been described above with a certain degree of particularity, or with reference to one or more individual embodiments, those skilled in the art could make numerous alterations to the disclosed embodiments without departing from the spirit or scope of the claimed disclosure. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosure as defined in the following claims.

What is claimed is:

1. A door closure apparatus comprising:

a baseplate configured to be coupled to an interior side of an inswing door adjacent a pivot edge of the door;

a motor mounted to the baseplate and configured to be activated in response to receipt of a signal from a remote electronic device;

a rotatable closing arm with a free first end and a second end, the second end drivingly coupled to the motor; and circuitry electrically coupled between a power supply and the motor, the circuitry configured to wirelessly send and receive information to and from the remote electronic device;

the closing arm configured to rotate toward and away from an adjacent surface separate from the door.

2. The door closure apparatus of claim 1, wherein in response to receipt of the signal from the remote electronic device, the motor is configured to rotate the closing arm to contact the adjacent surface separate from the door.

3. The door closure apparatus of claim 2, wherein the closing arm is configured to exert a closing force on the adjacent surface that repositions the door.

4. The door closure apparatus of claim 3, wherein the motor is configured to transmit a rotational force through the closing arm to exert the closing force on the adjacent surface, and wherein the closing force repositions the door to a closed position.

5. The door closure apparatus of claim 2, wherein the adjacent surface is generally parallel to a plane extending through a door frame the door is coupled to.

6. The door closure apparatus of claim 2, wherein the adjacent surface is generally normal to a plane extending through a door frame the door is coupled to.

7. The door closure apparatus of claim 2, wherein the adjacent surface is a door trim surrounding a portion of the door.

8. The door closure apparatus of claim 1, further comprising a proximity sensor configured to determine a position of the closing arm.

9. The door closure apparatus of claim 1, further comprising a proximity sensor configured to determine a position of the door.

10. The door closure apparatus of claim 9, wherein in response to receipt of a signal from the proximity sensor indicating the door is in a closed position, the motor is deactivated.

11. The door closure apparatus of claim 1, further comprising a roller mounted to the free first end of the closing arm.

12. The door closure apparatus of claim 1, wherein the closing arm has a maximum travel distance from a home position, wherein, in the home position, the free first end of the closing arm is spaced from the adjacent surface separate from the door, and wherein the maximum travel distance is used to determine when the door is in a closed position.

13. The door closure apparatus of claim 1, further comprising a clutch coupling the motor to the closing arm.

14. An apparatus for closing a door, comprising:

a baseplate configured to be coupled to an interior side of an inswing door, the door configured to be positioned in an open position, a closed position, and a plurality of positions in-between the open position and the closed position;

a closing arm with a free first end biasedly coupled to a second end, the second end coupled to a motor, the closing rotatable between a home position and an engaged position;

the motor coupled to the baseplate and configured to be activated in response of a signal from a remote electronic device;

a first proximity sensor configured to determine a position of the closing arm;

a second proximity sensor configured to determine a position of the door; and circuitry electrically coupled to a power supply, the motor, the first proximity sensor and the second proximity sensor, the circuitry configured to wirelessly send and receive information to and from the remote electronic device;

the closing arm configured to rotate toward and away from an adjacent surface separate from the door.

15. The apparatus of claim 14, wherein in the home position, the free first end of the closing arm is adjacent the baseplate and the door is configured to be positioned in the open position, the closed position, or the plurality of positions in-between the open position and the closed position.

16. The apparatus of claim 14, wherein in response to receipt of the signal from the remote electronic device, the motor is configured to reposition the closing arm from the home position to the engaged position, wherein in the engaged position the free first end of the closing arm contacts an adjacent surface and exerts a closing force on the adjacent surface that is translated through the closing arm to the door.

17. The apparatus of claim 14, wherein in response to a signal from the second proximity sensor indicating the door is in the closed position, the motor is deactivated.

18. A method of closing a door, comprising the steps of:

receiving a signal from a remote electronic device at an apparatus, the apparatus coupled to an inswing residential door;

rotating a closing arm of the apparatus from a home position to an engaged position, the closing arm having a free first end and a second end;

contacting the free first end of the closing arm with a surface adjacent to the door;

exerting a closing force on the surface adjacent to the door with the free first end of the closing arm;

rotating the door from an open position to a closed position; and rotating the closing arm from the engaged position to the home position.

19. The method of claim 18, further comprising sending and receiving a signal from a first proximity sensor and determining a position of the closing arm.

20. The method of claim 18, further comprising sending and receiving a signal from a second proximity sensor and determining a position of the door.

* * * * *